(12) United States Patent
Bates et al.

(10) Patent No.: US 7,272,826 B2
(45) Date of Patent: Sep. 18, 2007

(54) HIERARCHICAL BREAKPOINT GROUPS

(75) Inventors: Cary Lee Bates, Rochester, MN (US); Paul W. Buenger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 10/431,918

(22) Filed: May 8, 2003

(65) Prior Publication Data
US 2004/0225920 A1    Nov. 11, 2004

(51) Int. Cl.
*G06F 9/44* (2006.01)
(52) U.S. Cl. ........................ 717/129
(58) Field of Classification Search ............ 717/129
See application file for complete search history.

(56) References Cited

U.S. PATENT DOCUMENTS

| 6,295,613 | B1 | 9/2001 | Bates et al. |
| 6,378,125 | B1 | 4/2002 | Bates et al. |
| 2003/0106045 | A1* | 6/2003 | Arnold et al. ............ 717/129 |
| 2003/0115576 | A1* | 6/2003 | Bates et al. .............. 717/129 |
| 2003/0149961 | A1* | 8/2003 | Kawai et al. ............. 717/129 |

OTHER PUBLICATIONS

Nathan Fiedler, http://www.bluemarsh.com/pipermail/jswat-commit/2002-December/000007.html, printed on Jun. 12, 2006.*
Nathan Fiedler, http://www.bluemarsh.com/pipermail/jswat-dev/2001-March/000064.html, printed on Jun. 12, 2006.*

* cited by examiner

*Primary Examiner*—Wei Zhen
*Assistant Examiner*—Philip Wang
(74) *Attorney, Agent, or Firm*—Owen J. Gamon

(57) ABSTRACT

A method, apparatus, system, and signal-bearing medium that in an embodiment create breakpoint groups and breakpoints in a hierarchical tree structure. An operation directed to a breakpoint group is performed on both the breakpoint group and the descendents in the tree of the breakpoint group. But, an operation directed to a descendent is not performed against its ancestors. In this way, the user can ore easily organize, enable, and disable breakpoints.

17 Claims, 8 Drawing Sheets

```
┌─────────────────────────────────────────────────┐
│              200                                │
│                ↘                                │
│  ┌──────────────────────────────────────────┐   │
│  │  FILE   EDIT   TOOLS                     │   │
│  ├──────────────────┬───────────────────────┤   │
│  │   BREAKPOINTS    │ /QSYS.LIB/TESTEST.LIB/TESTPGM.PGM │
│  ├──────────────────┼───────────────────────┤   │
│  │ BREAKPOINT GROUPS│ 12 INT MAIN           │   │
│  │ └DEFAULT ╲215    │                       │   │
│  │   └/QSYS.LIB/TESTLIB.LIB │ 13 { INT RESULTS[5] │
│  │     └TESTPGM     │ 14                    │   │
│  │       ├LINE: 18╲ │ 15 FOR {INT IND = 0; IND < 5; ++IND │
│  │       │     ╲218 │                       │   │
│  │       ├LINE: 23╲ │ 16 {  TEST *TEST = MODULE 1 (IND, │
│  │       │     ╲223 │ 17                    │   │
│  │       └LOWER╲    │                  ╱248 │   │
│  │           ╲222   │ 18    INT X = TEST ->X; │ │
│  │        └/QSYS.LIB/TEST. │ 19    INT Y = TEST ->Y; │
│  │          └TESTPGM│ 20    INT Z = MODULE2 (X,Y);╲ │
│  │            └LINE: 20╲ │                    ╲240│
│  │                  ╲220 │ 21                  │ │
│  │                  │ 22    CHAR RESULT[100]; │   │
│  │         ↖        │ 23    SPRINTF(RESULT, Z = %D",Z); │
│  │          205     │                      ╲243│
│  │                  │ 24                    │   │
│  │                  │ 25    RESULTS[IND] = Z; │   │
│  │                  │ 26  }                 │   │
│  │                  │                    ↖210│   │
│  │                  │ 27                    │   │
│  └──────────────────┴───────────────────────┘   │
└─────────────────────────────────────────────────┘
```

FIG. 2

HIERARCHICAL BREAKPOINT GROUPS

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention generally relates to computer programming and ore specifically relates to grouping breakpoints in order to debug a computer program.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until a breakpoint is reached. The debugger then stops execution of the program and displays the results of the program to the programmer for analysis.

Typically, step operations and breakpoints are used together to simplify the debugging process. Specifically, a common debugging operation is to set a breakpoint at the beginning of a desired set of instructions to be analyzed and then begin executing the program. Once the breakpoint is reached, the debugger halts the program, and the programmer then steps through the desired set of instructions line-by-line using the step operation. Consequently, a programmer is able to more quickly isolate and analyze a particular set of instructions without having to step through irrelevant portions of a computer program.

Thus, once the programmer determines the appropriate places in the program and sets breakpoints at those appropriate places, the breakpoints can be a powerful tool. But, many breakpoints may be needed, and the breakpoints needed may change over time as the programmer gains more information about the problem being debugged. Hence, determining the appropriate places in the program, setting breakpoints at those places, and removing the breakpoints that are no longer needed can be an arduous task.

To make setting and removing breakpoints easier, some conventional debuggers have breakpoint groups. The primary use of these groups is to form a collection of breakpoints, which can be enabled and disabled all at once. Breakpoint groups allow the programmer to more rapidly adjust the debug environment and not be burdened by excessive and undesired breakpoint hits.

Unfortunately, breakpoint groups only allow a breakpoint to exist in one group at a time, and breakpoint groups have no relationship to one another, which limits the usefulness of the breakpoint groups. For example, consider a program with a large outer loop that contains breakpoints and a small inner loop that also contains breakpoints. There are times the user needs to only disable the breakpoints in the inner loop without disabling the breakpoints in the outer loop, and times when the user wants to disable both the breakpoints in the outer loop and the inner loop. Today, users must attempt to deal with this problem by either manipulating the breakpoints individually or creating multiple breakpoint groups and manipulating these groups individually while attempting to remember all the relationships between the groups.

Without a better way to manage breakpoints, the debugging of programs will continue to be a difficult and time-consuming task, which delays the introduction of software products and increases their costs. Although the aforementioned problems have been described in the context of loops, they may apply to any type of statements in a program to be debugged.

SUMMARY

A method, apparatus, system, and signal-bearing medium are provided that in an embodiment create breakpoint groups and breakpoints in a hierarchical tree structure. An operation directed to a breakpoint group is performed on both the breakpoint group and the descendents in the tree of the breakpoint group. But, an operation directed to a descendent is not performed against its ancestors. In this way, the user can more easily organize, enable, and disable breakpoints.

BRIEF DESCRIPTION OF THE DRAWINGS

FIG. 2 depicts a pictorial representation of an example user interface for requesting the manipulation of a hierarchy of breakpoint groups, according to an embodiment of the invention.

DETAILED DESCRIPTION

Figure 1:
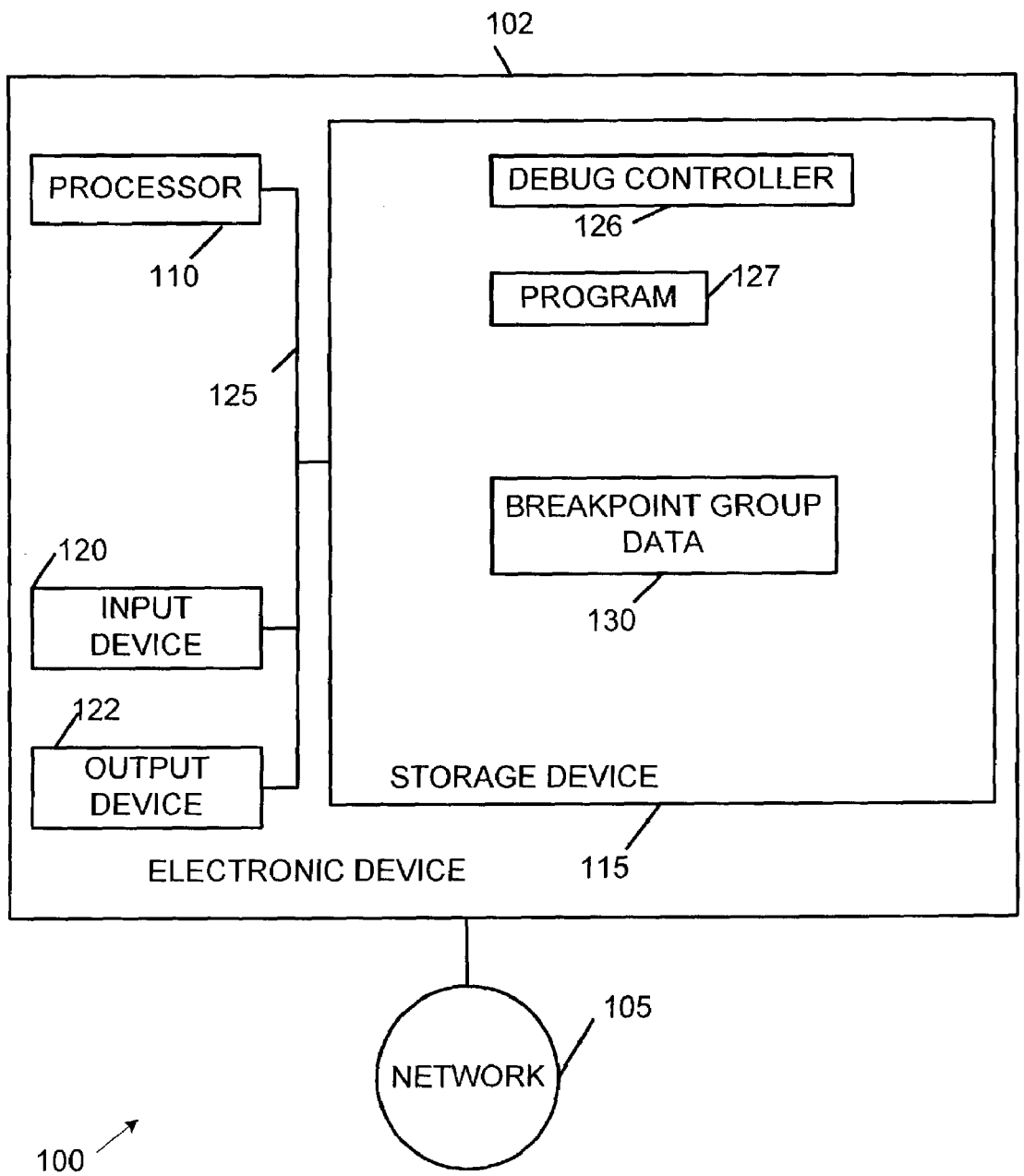
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a network 105. Although only one electronic device 102 and one network 105 are shown, in other embodiments any number or combination of them may be present. In another embodiment, the network 105 is not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, it may be distributed across other electronic devices, such as devices connected to the network 105.

The storage device 115 includes a debug controller 126, a program 127, and breakpoint group data 130, all of which may in various embodiments have any number of instances. The debug controller 126 creates the breakpoint group data 130 in order to debug the program 127. In an embodiment, the debug controller 126 includes instructions capable of executing on the processor 110 or statements capable of being interpreted by instructions executing on the processor 110 to display the user interfaces as further described below with reference to FIG. 2 and to carry out the functions as further described below with reference to FIGS. 4, 5, 6, 7, 8, and 9 using the breakpoint group data 130. In another embodiment, the debug controller 126 may be implemented in hardware via logic gates and/or other appropriate hardware techniques.

The program 127 includes instructions capable of executing on the processor 110 or statements capable of being interpreted by instructions executing on the processor 110. The program 127 is to be debugged using the debug controller 126.

The breakpoint group data 130 is generated by the debug controller 126 and contains hierarchical information about breakpoint groups and breakpoints in the program 127 where the breakpoints are to be set. The breakpoint group data 130 is further described below with reference to FIG. 3.

Although the debug controller 126, the program 127, and the breakpoint group data 130 are all illustrated as being contained within the storage device 115 in the electronic device 102, in other embodiments some or all of them may be on different electronic devices and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of FIG. 2, as further described below.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interface of FIG. 2.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3×specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

FIG. 2 depicts a pictorial representation of an example user interface 200 for requesting the manipulation of a hierarchy of breakpoint groups, according to an embodiment of the invention. Displayed within the user interface 200 are a breakpoint group hierarchy panel 205 and a program listing panel 210.

The breakpoint group hierarchy panel 205 includes a hierarchy of breakpoint groups and breakpoints. Illustrated in the group hierarchy panel 205 are a default breakpoint group 215, having a breakpoint 218, a breakpoint 223, and a lower breakpoint group 222. The lower breakpoint group 222 has a breakpoint 220. The breakpoint 218 is set at line 18 of the program 127, the breakpoint 223 is set at line 23 of the program 127, and the breakpoint 220 is set at line 20 of the program 127.

The user may request via the user interface 200 that the debug controller 126 add a new breakpoint group to the hierarchy panel 205, add a breakpoint to the hierarchy, drag or drop a breakpoint group in the hierarchy, and enable or disable a breakpoint group in the hierarchy, as further described below with reference to FIGS. 4, 5, 6, 7, 8, and 9.

The breakpoint groups and breakpoints in the panel 205 are displayed in a hierarchical tree view. A tree view is a graphical method for displaying a hierarchical organization of objects. A tree view takes its name from an analogy to trees in nature, which have a hierarchical organization of branches and leaves. For example, a leaf belongs to a small branch, which further belongs to a large branch, and all branches of the tree have a common starting point at the root.

Analogously, breakpoint groups and breakpoints can have a hierarchical organization, in that a breakpoint group or breakpoint can be contained in another breakpoint group, which can further be further contained in another breakpoint group, and so on. Thus, all breakpoint groups and breakpoints can be divided up into sub-groups and groups that ultimately are all contained in a root breakpoint group. The structure of the displayed tree view in the panel 205 shows both nesting of groups and breakpoints and where they belong in the nested hierarchical organization.

To define a tree more formally, a tree structure defines the hierarchical organization of objects. A tree is a finite set, T, of one or more objects, such that a) there is one specially designated object called the root of the tree; and b) the remaining objects (excluding the root) are partitioned into m>=0 disjoint sets T1, . . . Tm, and each of these sets is in turn a tree.

The trees T1, . . . , Tm are called the subtrees of the root. Thus, every object in a tree is the root of some subtree contained in the whole tree. The number of subtrees of an object is called the degree of that object. An object of degree zero is called a terminal object or a leaf. A non-terminal object is called a branch object. The level of an object with respect to T is defined by saying that the root has level 0, and other objects have a level that is one higher than they have with respect the subtree that contains them. Each root is the parent of the roots of its subtrees, and the latter are siblings, and they are also the children of their parent. The objects in the subtrees of a root are the root's descendants. The root of the entire tree has no parent.

The program listing panel 210 includes a list of statements in the program 127 to be debugged using the breakpoint groups and breakpoints listed in the breakpoint group hierarchy panel 205. Shown in the program listing panel 210 are a statement 248 where the breakpoint 218 is set, a statement 240 where the breakpoint 220 is set, and a statement 243 where the breakpoint 223 is set.

The user interface 200 is exemplary only, and in other embodiments any appropriate user interface may be used to invoke the functions of FIGS. 4, 5, 6, 7, 8, and 9. The groups and breakpoints illustrated in the hierarchy panel 205 and the statements illustrated in the program listing panel 210 for the program 127 are exemplary only, and in other embodiments any breakpoint groups, breakpoints, and statements may be used. Further, a breakpoint group may contain any number of breakpoints and any number of other breakpoint groups, including zero.

Figure 3:
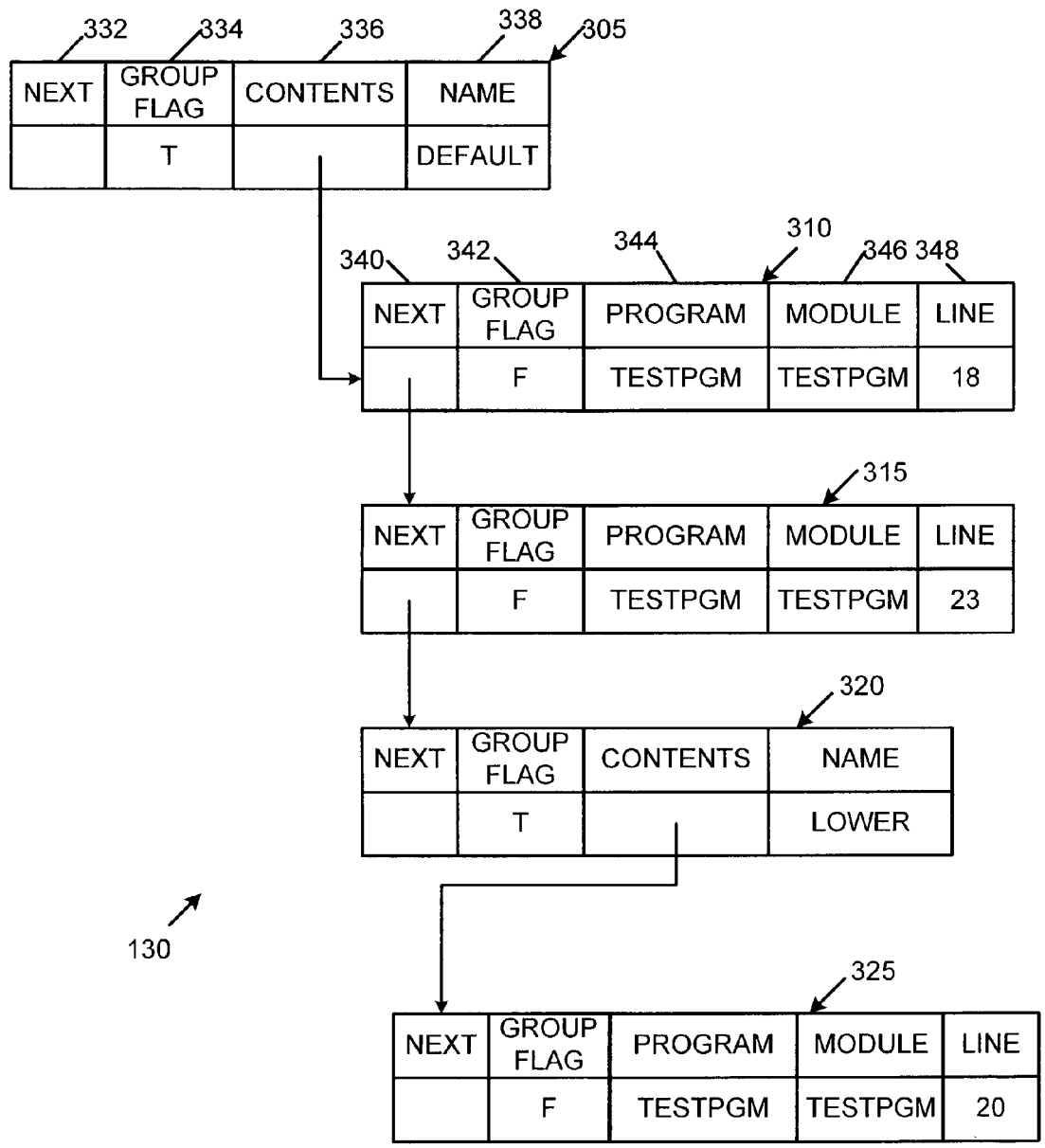
FIG. 3 depicts a block diagram of an example data structure that represents a hierarchy of breakpoint groups, according to an embodiment of the invention.

FIG. 3 depicts a block diagram of a data structure for the breakpoint group data 130, which represents a hierarchy of breakpoint groups and breakpoints, according to an embodiment of the invention.

The breakpoint group data 130 includes an entry or record for each breakpoint group and each breakpoint shown in the hierarchy panel 205, such as example records 305, 310, 315, 320, and 325. The record 305 is associated with the breakpoint group 215 in FIG. 2; the record 310 is associated with the breakpoint 218 in FIG. 2; the record 315 is associated with the breakpoint 223 in FIG. 2; the record 320 is associated with the breakpoint group 222 in FIG. 2; and the record 325 is associated with the breakpoint 220 in FIG. 2.

Although the embodiment shown in FIG. 3 shows five records 305, 310, 315, 320, and 325 in the breakpoint group data 130, in another embodiment any appropriate records may be present, and a breakpoint group may contain any number of breakpoints. Further a breakpoint group may contain any number of other breakpoint groups.

Each breakpoint group record, such as the breakpoint group record 305, includes a next field 332, a group flag field 334, a contents field 336, and a name field 338, although in other embodiments more or fewer fields may be present. Each breakpoint record, such as the breakpoint record 310, includes a next field 340, a group flag 342, a program field 344, a module field 346, and a line field 348, although in other embodiments more or fewer fields may be present.

The next field 332 in a group record points to the next group at the same hierarchical level (a sibling) and in an embodiment is null when no such next group exists. In other embodiments any other appropriate mechanism may be used to indicate that no group at the same level exists.

The group flag field 334 indicates whether the record is a breakpoint group record or a breakpoint record. In an embodiment, when the group flag 334 contains "T" for "True," the record is a breakpoint group record, but in other embodiments "1" or any other appropriate value may be used.

The contents field 336 points to a record at a lower hierarchical level (the child) than the record 305. In the example shown, the contents field 336 points at the record 310, which is a breakpoint record, but in other embodiments, the child of the record 305 may be another breakpoint group record.

The name field 338 contains the name of the breakpoint group. In the example shown, the contents of the name field 338 is "default," which corresponds to the default group 215 in FIG. 2.

The next field 340 in a breakpoint record points to the next breakpoint record at the same hierarchical level (a sibling). In an embodiment, the next field 340 is null when no such next record exists. In other embodiments any other appropriate mechanism may be used to indicate that no next record at the same level exists.

The group flag 342 indicates whether the record is a breakpoint group record or a breakpoint record. In an embodiment, when the group flag 342 contains "F" for "False" the record is a breakpoint record, but in other embodiments "0" or any other appropriate value may be used.

Values in the program field 344 and the module field 346 indicate the program and module, respectively, within the program 127. In another embodiment, the module field 346 is optional or not used.

The line field 348 indicates the statement number, instruction number, offset, or other information identifying the location in the program 127 where the associated breakpoint is set.

The values shown in FIG. 3 are exemplary only, and in other embodiments any appropriate values may be present.

Figure 4:
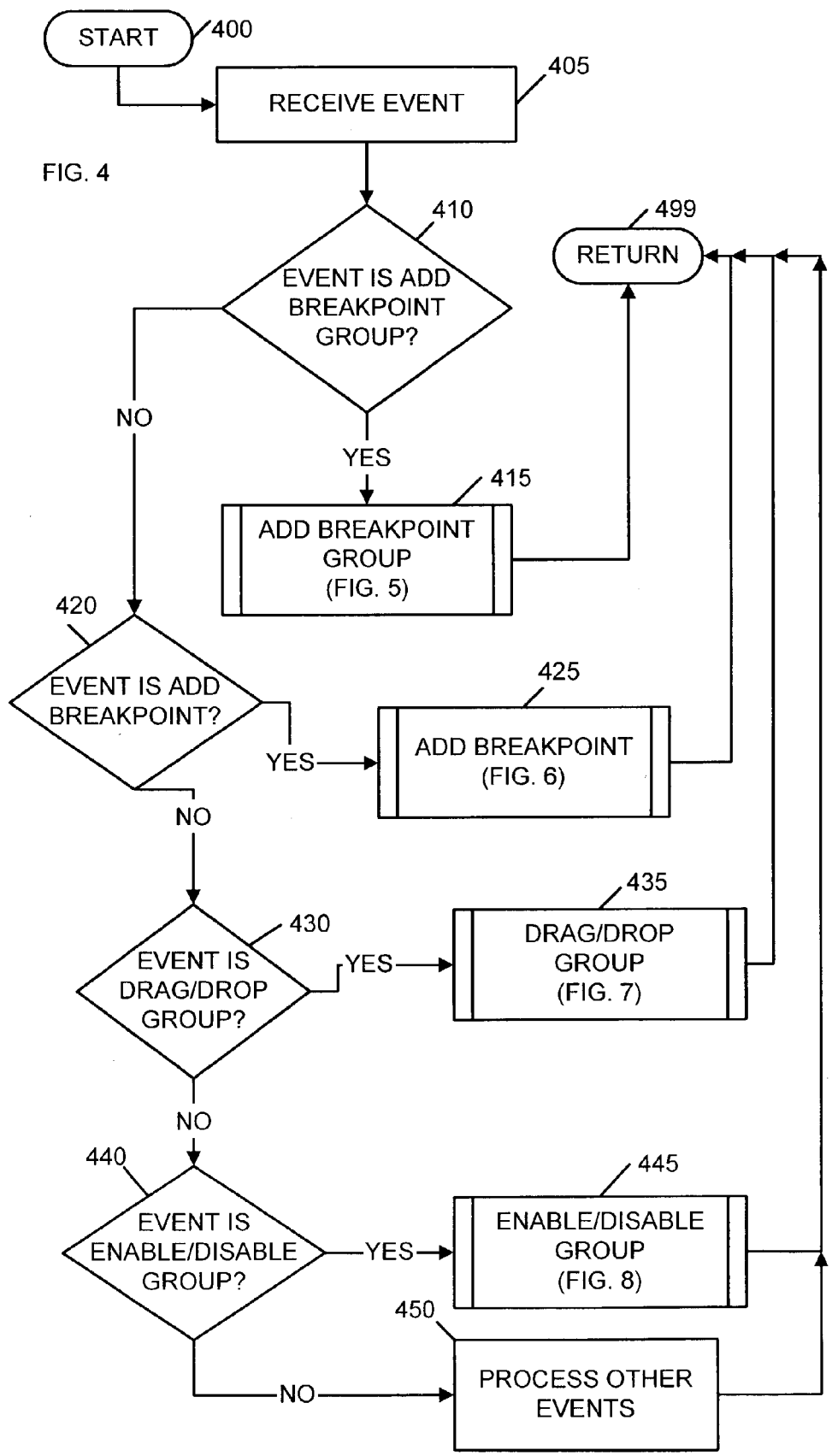
FIG. 4 depicts a flowchart of example processing to manipulate a hierarchy of breakpoint groups, according to an embodiment of the invention.

FIG. 4 depicts a flowchart of example processing to manipulate a hierarchy of breakpoint groups in the breakpoint group data 130, according to an embodiment of the invention. Control begins at block 400. Control then continues to block 405 where the debug controller 126 receives an event from the user interface 200. Control then continues to block 410 where the debug controller 126 determines whether the event received is an add breakpoint group event. If the determination at block 410 is true, then control continues to block 415 where the debug controller 126 adds a new breakpoint group to the breakpoint group data 130 and displays the new breakpoint group in the hierarchy panel 205, as further described below with reference to FIG. 5. Control then continues to block 499 where the function returns.

If the determination at block 410 is false, then control continues from block 410 to block 420 where the debug controller 126 determines whether the event received is an add breakpoint event. If the determination at block 420 is true, then control continues to block 425 where the debug controller 126 adds a new breakpoint to a specified breakpoint group in the breakpoint group data 130 and to the hierarchy panel 205, as further described below with reference to FIG. 6. Control then continues to block 499 where the function returns.

If the determination at block 420 is false, then control continues from block 420 to block 430 where the debug controller 126 determines whether the event received is a drag and drop group event. If the determination at block 430 is true, then control continues to block 435 where the debug controller 126 drags and drops the breakpoint group in the hierarchy panel 205 and updates the breakpoint group data 130 to reflect the drag-and-drop operation, as further described below with reference to FIG. 7. Control then continues to block 499 where the function returns.

If the determination at block 430 is false, then control continues from block 430 to block 440 where the debug controller 126 determines whether the event received is an enable breakpoint group operation or a disable breakpoint group operation. If the determination at block 440 is true, then control continues to block 445 where the debug controller 126 performs enable or disable group processing, as further described below with reference to FIG. 8. Control then continues to block 499 where the function returns.

If the determination at block 440 is false, then control continues from block 440 to block 450 where the debug controller 126 processes other events. Control then continues to block 499 where the function returns.

Although FIG. 4 illustrates the debug controller supporting an add breakpoint group operation, an add breakpoint operation, a drag-and-drop group operation, and an enable/disable group operation, in other embodiments, the debug controller 126 may perform more or fewer operations. For example, in various other embodiments, the debug controller 126 may support a delete breakpoint operation, a delete breakpoint group operation, and a drag breakpoint to group operation.

Figure 5:
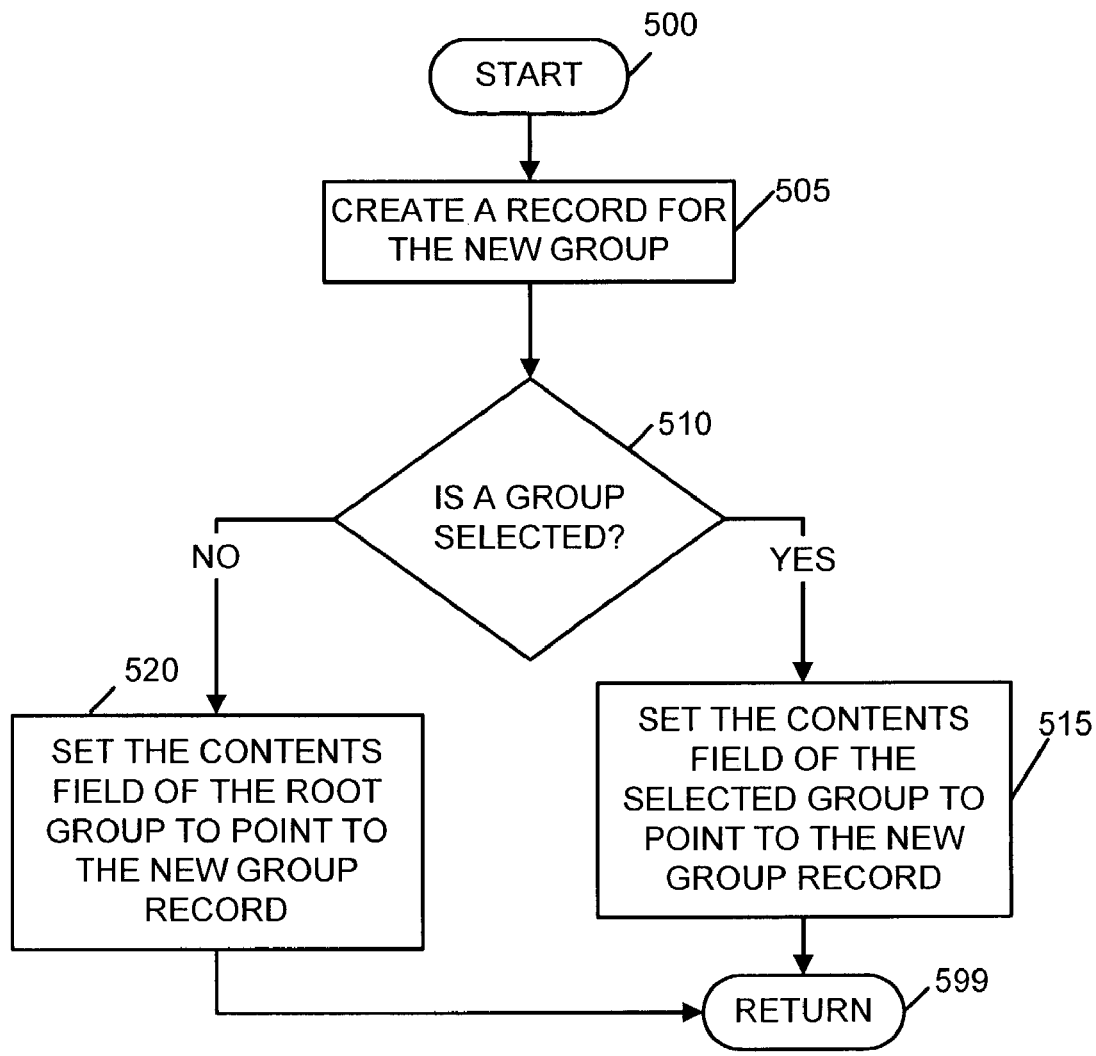
FIG. 5 depicts a flowchart of example processing for adding a breakpoint group to a hierarchy, according to an embodiment of the invention.

FIG. 5 depicts a flowchart of example processing for adding a breakpoint group to a hierarchy, according to an embodiment of the invention. Control begins at block 500. Control then continues to block 505 where the debug controller 126 creates a record for the breakpoint group in the breakpoint group data 130. Examples of group records are records 305 and 320 in FIG. 3.

The debug controller 126 sets the group flag 334 to indicate the record is a group record and sets the name field 338 to be the provided name. The debug controller 126 further sets the contents field 336 in the new group record to point to another group or a breakpoint record that is a child of the new group record if such another group or breakpoint record is provided. The debug controller 126 further sets the next field 332 in the new group record to point to a sibling group record or breakpoint record if provided.

Control then continues to block 510 where the debug controller 126 determines whether a group in the hierarchy panel 205 is selected or provided. If the determination at block 510 is true, then control continues to block 515 where the debug controller 126 sets the contents field 336 of the selected group to point to the new group record, which was previously created at block 505. In an embodiment, the debug controller 126 may refresh the display of the breakpoint group data 130 in the breakpoint group hierarchy panel 205 in order to shown the new breakpoint group. Control then continues to block 599 where the function returns.

If the determination at block 510 is false, then a group was not selected, so control continues from block 510 to block 520 where the debug controller 126 sets the contents field 336 of the root group to point to the new group record, which was previously created at block 505. In an embodiment, the debug controller may refresh the display of the breakpoint group data 130 in the breakpoint group hierarchy panel 205 in order to shown the new breakpoint group. Control then continues to block 599 where the function returns.

In this way, the debug controller 126 builds and displays a tree hierarchy of breakpoint group records.

Figure 6:
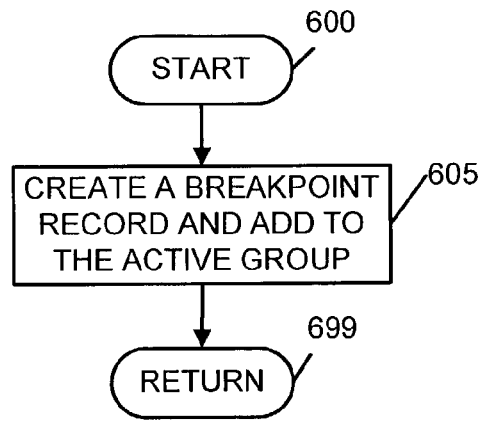
FIG. 6 depicts a flowchart of example processing for adding a breakpoint to a hierarchy of breakpoint groups, according to an embodiment of the invention.

FIG. 6 depicts a flowchart of example processing for adding a breakpoint to a hierarchy of breakpoint groups, according to an embodiment of the invention. Control begins at block 600. Control then continues to block 605 where the debug controller 126 creates a breakpoint record and adds it to the active group. Examples of breakpoint records are shown in FIG. 3 as records 310, 315, and 325.

The debug controller 126 sets the group flag 342 to indicate that the new record is a breakpoint record, sets the program field 344 to contain an identifier of the program 127 in which the breakpoint is set, sets the module field 346 to indicate the module, if any, within the program, and sets the line field 348 to indicate the line, position, statement, or instruction within the program and/or module where the breakpoint is set. The debug controller 126 also sets the next field 340 in the new breakpoint record to point to a sibling breakpoint record or sibling breakpoint group record or sets the next field 340 to indicate that no sibling exists.

The debug controller 126 also sets the contents field 336 of the parent breakpoint group, e.g. the group 305 or 320, to point to the new breakpoint record or sets the next field 340 of a previously-existing sibling breakpoint record if present to point to the new breakpoint record. Control then continues to block 699 where the function returns.

Figure 7:
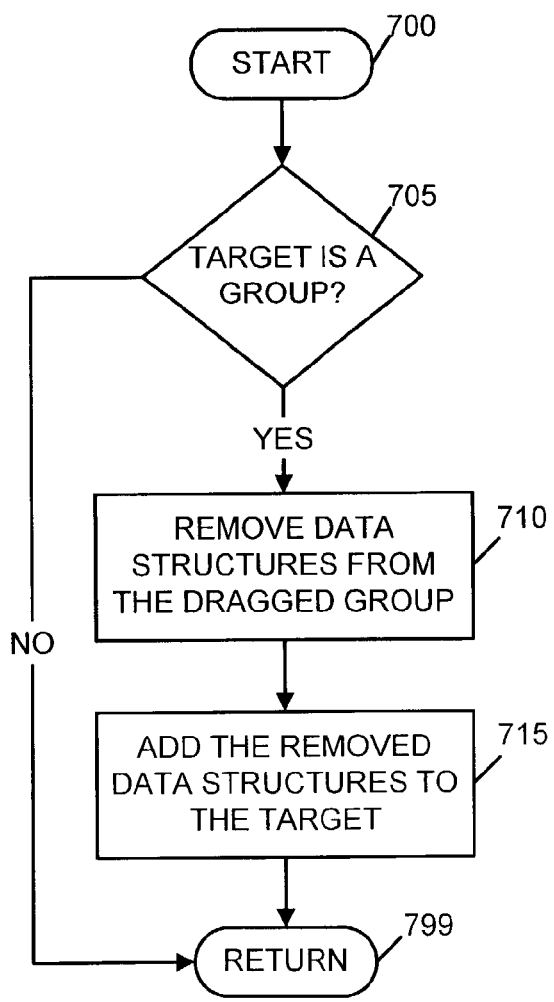
FIG. 7 depicts a flowchart of example processing for dragging and dropping a breakpoint group within a hierarchy of breakpoint groups, according to an embodiment of the invention.

FIG. 7 depicts a flowchart of example processing for dragging and dropping a breakpoint group within a hierarchy of breakpoint groups, according to an embodiment of the invention. Control begins at block 700. Control then continues to block 705 where the debug controller 126 determines whether the target of the drag-and-drop operation is a group. If the determination at block 705 is true, then control continues to block 710 where the debug controller 126 removes the associated data structures from the source of the dragged group, adjusts the contents 336 of any source parent of the dragged group, adjusts the next field 332 of any source sibling group, and adjusts the next field 340 of any source sibling breakpoint.

Control then continues to block 715 where the debug controller 126 adds the removed data structures to the target group. The debug controller 126 adjusts the contents 336 of any target parent of the dragged group, adjusts the next field 332 of any appropriate target sibling group, and adjusts the next field 340 of any appropriate target sibling. The debug controller 126 further adjusts the next field 332 and contents field 336 of the dragged group to point to any appropriate target sibling group and any appropriate child. Control then continues to block 799 where the function returns.

If the determination at block 705 is false, then control continues from block 705 to block 799 where the function returns an error since, in an embodiment, a group drag-and-drop must be directed to another group. But, in another embodiments, a group drag-and-drop operation may be performed against other constructs.

Figure 8:
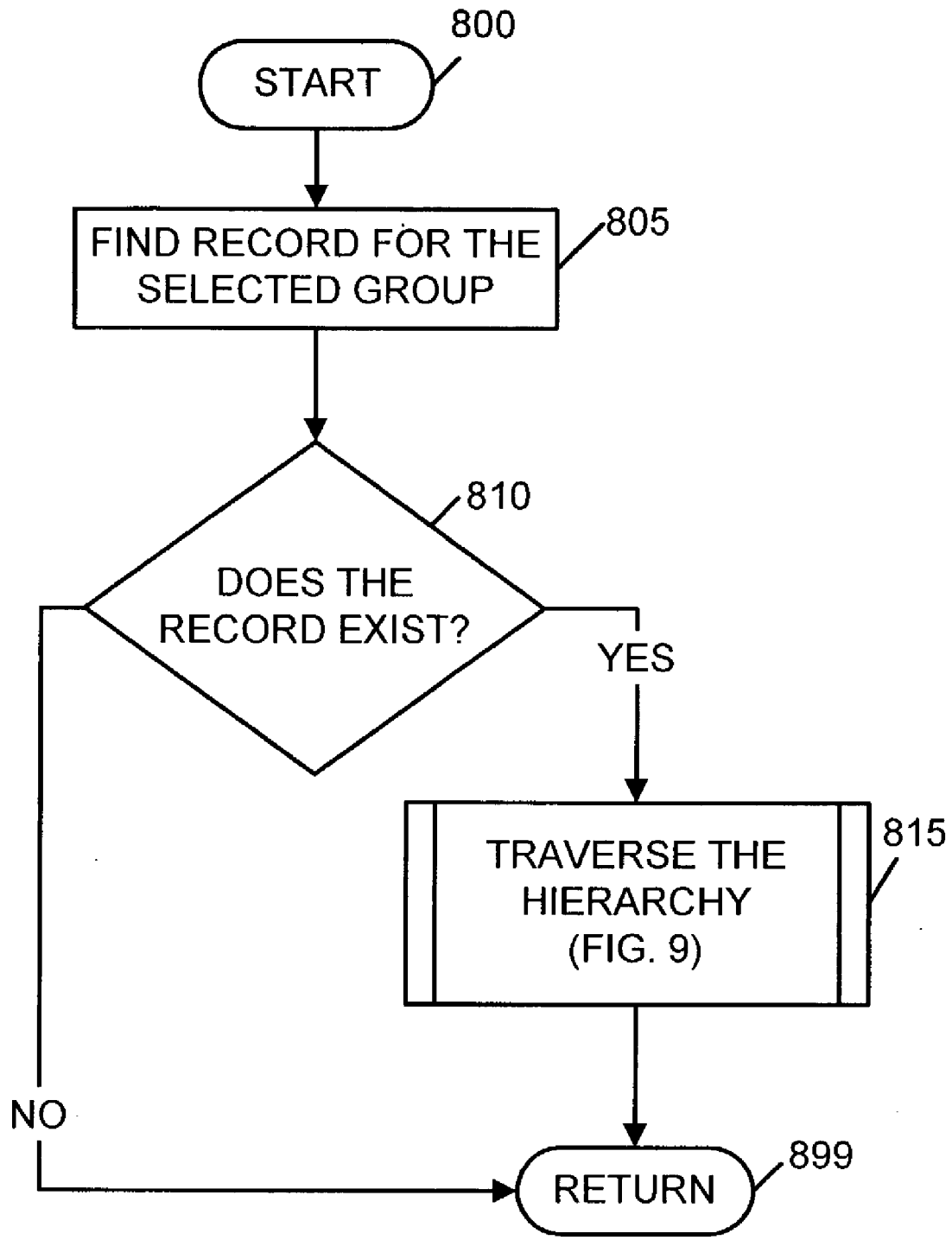
FIG. 8 depicts a flowchart of example processing for enabling and disabling breakpoints in a hierarchy of breakpoint groups, according to an embodiment of the invention.

FIG. 8 depicts a flowchart of example processing for enabling and disabling breakpoints in a hierarchy of breakpoint groups, according to an embodiment of the invention. Control begins at block 800. Control then continues to block 805 where the debug controller 126 finds the record for the selected group. Control then continues to block 810 where the debug controller 126 determines whether a record was found at block 805. If the determination at block 810 is true, then control continues to block 815 where the controller 126 traverses the hierarchy, as further described below with reference to FIG. 9. Control then continues to block 899 where the function returns.

If the determination at block 810 is false, then control continues directly from block 810 to block 899 where the function returns.

Figure 9:
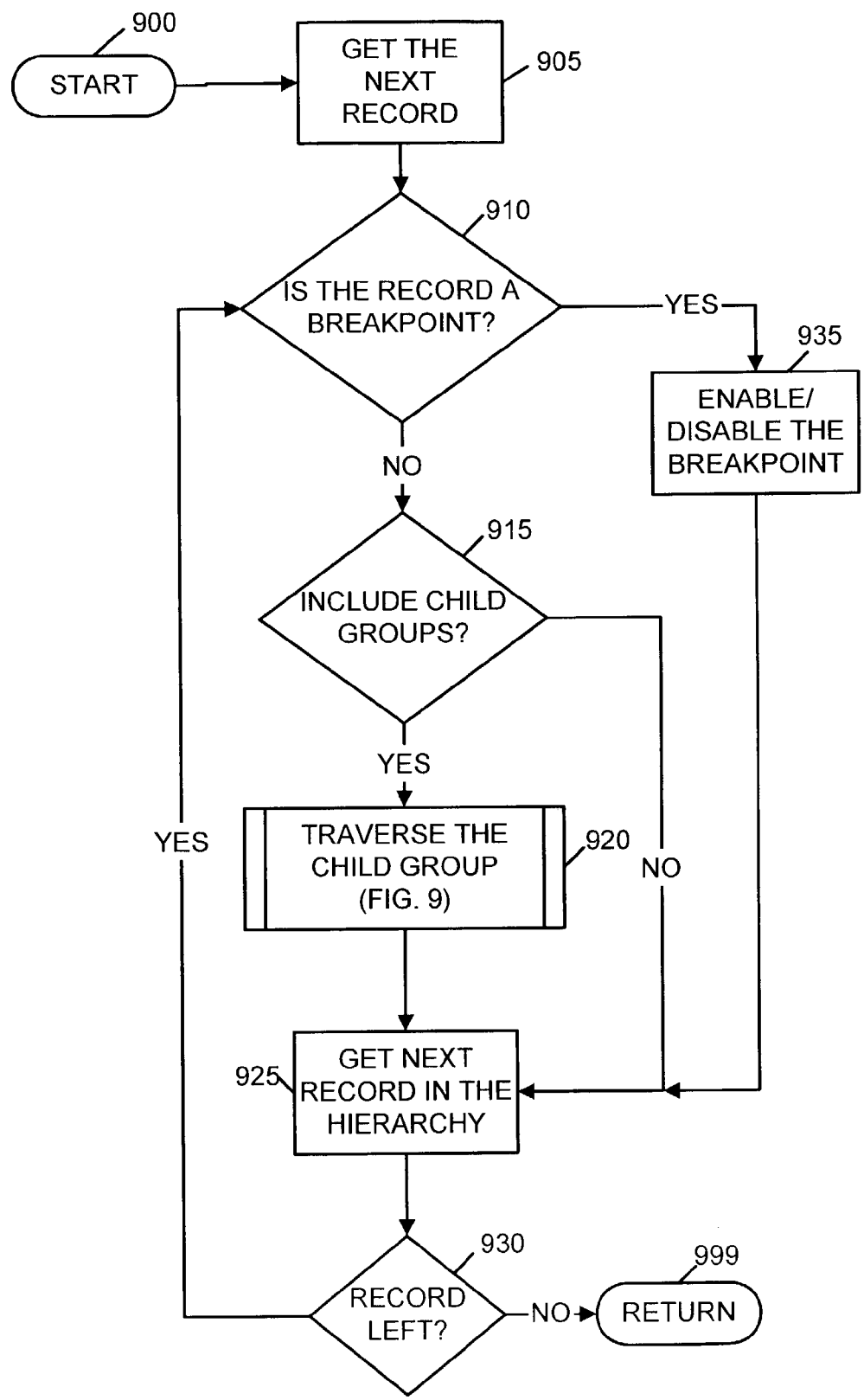
FIG. 9 depicts a flowchart of example processing for traversing a hierarchy of breakpoint groups, according to an embodiment of the invention.

FIG. 9 depicts a flowchart of example processing for traversing a hierarchy of breakpoint groups, according to an embodiment of the invention. Control begins at block 900. Control then continues to block 905 where the debug controller 126 gets the next record in the hierarchy using the next field 332 or the next field 340. Examples of records are shown in FIG. 3 as records 305, 310, 315, 320, and 325.

Control then continues to block 910 where the debug controller 126 determines whether the record is a breakpoint record (e.g., records 310, 315, and 325) by checking the group flags 334 and 342. If the determination at block 910 is false, then control continues to block 915 where the debug controller 126 determines whether breakpoints in any child groups are to be processed. In an embodiment, the user may specify an option as to whether or not to process any child groups. In another embodiment, the debug controller 126 uses a default to not process any child groups. In another embodiment, the debug controller 126 uses a default to process any child groups. The debug controller 126 uses the contents field 336 to find any child groups.

If the determination at block 915 is true, then control continues to block 920 where the debug controller 126 traverses any child groups via a recursive call to the logic of FIG. 9. Control then continues to block 925 where the debug controller 126 gets the next record in the hierarchy using the next field 332. Control then continues to block 930 where the debug controller 126 determines whether any records are left to process using the next field 332. If the determination at block 930 is true, then control returns to block 910, as previously described above. If the determination at block 930 is false, then control continues to block 999 where the function returns.

If the determination at block 915 is false, then control continues from block 915 directly to block 925, as previously described above.

If the determination at block 910 is true, then control continues from block 910 to block 935 where the debug controller 126 enables or disables the breakpoint in the record, depending on the received request. Control then continues to block 925, where the debug controller 126 gets the next record in the hierarchy using the next field 340. Control then continues to block 930 where the debug controller 126 determines whether any records are left to process using the next field 340. If the determination at block 930 is true, then control returns to block 910, as previously described above. If the determination at block 930 is false, then control continues to block 999 where the function returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   creating a hierarchy of a plurality of breakpoint groups, wherein a first breakpoint group in the plurality of breakpoint groups is a parent of a second breakpoint group in the plurality of breakpoint groups, wherein the first breakpoint group comprises a first plurality of breakpoints and the second breakpoint group comprises a second plurality of breakpoints;
   receiving a request for an operation directed to the first breakpoint group;
   determining whether a child group option is specified;
   performing the operation against both the first plurality of breakpoints in the first breakpoint group and the second plurality of breakpoints in the second breakpoint group if the child group option is specified; and
   performing the operation against the first plurality of breakpoints in the first breakpoint group but not the second plurality of breakpoints in the second breakpoint group if the child group option is not specified.

2. The method of claim 1, wherein the operation comprises a disable breakpoint group operation.

3. The method of claim 1, wherein the operation comprises an enable breakpoint group operation.

4. The method of claim 1, further comprising:
   in response to a request for an operation directed to die second breakpoint group, performing the operation against the second breakpoint group independent of the first breakpoint group.

5. An apparatus comprising:
   means for receiving an operation directed to a first breakpoint group;
   means for determining whether a child group option is specified;
   means for finding a descendent of the first breakpoint group, wherein the first breakpoint group comprises a first plurality of breakpoints and the descendant comprises a second breakpoint group comprising a second plurality of breakpoints;
   means for performing the operation against the first plurality of breakpoints in the first breakpoint group and the second plurality of breakpoints in the descendent if the child group option is specified; and
   means for performing the operation against first plurality of breakpoints in the first breakpoint group but not the second plurality of breakpoints of the descendent if the child group option is not specified.

6. The apparatus of claim 5, wherein the operation comprises an enable breakpoint group operation.

7. The apparatus of claim 5, wherein the operation comprises an disable breakpoint group operation.

8. The apparatus of claim 5, wherein the means for finding the descendent further comprises:
   means for traversing a tree data structure.

9. A storage medium encoded with instructions, wherein the instructions when executed comprise:
   receiving a request directed to a first breakpoint group, wherein the first breakpoint group comprises a first plurality of breakpoints;
   determining whether a child group option is specified;
   finding all of a plurality of descendents of the first breakpoint group, wherein the plurality of descendents comprises a second plurality of breakpoints and a second breakpoint group;
   performing an operation on the first plurality of breakpoints of the first breakpoint group and on the plurality of descendents if the child group option is specified, in response to the request; and performing the operation against the first plurality of breakpoints of the first breakpoint group but not on the plurality of descendents if a child group option is not specified, in response to the request.

10. The storage medium of claim 9, wherein a sibling of the second breakpoint group comprises one of the second plurality of breakpoints.

11. The storage medium of claim 9, wherein the performing the operation on the first breakpoint group in response to the request further comprises:

enabling all of the first plurality of breakpoints in the first breakpoint group.

12. The storage medium of claim 9, wherein the performing an operation on the first breakpoint group in response to the request further comprises:

disabling all of the first plurality of breakpoints in the first breakpoint group.

13. An electronic device comprising:

a processor; and a storage device encoded with instructions, wherein the instructions when executed on the processor comprise:

creating a plurality of breakpoint groups and a plurality of breakpoints in a hierarchical tree structure, receiving a first request directed to a first breakpoint group in the plurality of breakpoint groups, wherein the first breakpoint group comprises a first subset of the plurality of breakpoints, determining whether a child group option is specified, finding all of a plurality of descendents of the first breakpoint group, performing a first operation on the first subset of the plurality of breakpoints in the first breakpoint group and the plurality of descendents if the child group option is specified, in response to the first request, and performing the first operation on the first subset of the plurality of breakpoints of the first breakpoint group but not the plurality of descendents if the child group option is not specified, in response to the first request.

14. The electronic device of claim 13, wherein at least one of the plurality of breakpoint groups is a sibling in the hierarchical tree structure of at least one of the plurality of breakpoints.

15. The electronic device of claim 13, wherein the instructions further comprise:

receiving a second request directed to one of the plurality of descendents; and performing a second operation to the one of the plurality of descendents in response to the second request, independent of the first breakpoint group.

16. The electronic device of claim 13, wherein at least one of the plurality of descendents is one of the plurality of breakpoint groups.

17. The electronic device of claim 13, wherein the first operation is a disable breakpoint operation.

* * * * *